United States Patent
Kolotov et al.

(10) Patent No.: US 10,171,326 B2
(45) Date of Patent: Jan. 1, 2019

(54) METHOD AND APPARATUS FOR ESTIMATING A MAXIMUM TIME INTERVAL ERROR IN A DATA TRANSMISSION NETWORK

(71) Applicant: ADVA Optical Networking SE, Meiningen (DE)

(72) Inventors: Georgy Kolotov, Raanana (IL); Opher Ronen, Ness Ziona (IL); Nir Laufer, Zoran (IL); Israel Sasson, Raanana (IL)

(73) Assignee: ADVA Optical Networking SE, Meiningen (DE)

( * ) Notice: Subject to any disclaimer, the term of this patent is extended or adjusted under 35 U.S.C. 154(b) by 469 days.

(21) Appl. No.: 14/747,993

(22) Filed: Jun. 23, 2015

(65) Prior Publication Data

US 2015/0381451 A1   Dec. 31, 2015

(30) Foreign Application Priority Data

Jun. 26, 2014  (EP) ..................... 14002195

(51) Int. Cl.
*G06F 15/173* (2006.01)
*H04L 12/26* (2006.01)
(Continued)

(52) U.S. Cl.
CPC ............ *H04L 43/0864* (2013.01); *H04J 3/14* (2013.01); *H04L 1/205* (2013.01); *H04L 7/0016* (2013.01)

(58) Field of Classification Search
None
See application file for complete search history.

(56) References Cited

U.S. PATENT DOCUMENTS

| 6,222,877 B1* | 4/2001 | Govindarajan ........ H04B 3/46 375/224 |
| 7,146,288 B1* | 12/2006 | Welch ................ H04N 21/4344 702/179 |

(Continued)

FOREIGN PATENT DOCUMENTS

EP        1152562 A1      7/2001

OTHER PUBLICATIONS

Stefano Bregni, Fast Computation of Maximum Time Interval Error by Binary Decomposition, Jun. 6, 1999, pp. 1741-1745 (Year: 1999).*

(Continued)

*Primary Examiner* — Phyllis A Book
(74) *Attorney, Agent, or Firm* — The Culbertson Group, P.C.

(57) ABSTRACT

A method for use in connection with a data transmission network includes receiving a plurality of time interval error data samples over a sampling period and comparing a duration of the sampling period to a time threshold for the sampling period. If the duration of the sampling period is less than or equal to the time threshold for the sampling period, the method includes processing the received plurality of data samples so as to calculate in real time a maximum time interval error. However, if the duration of the sampling period exceeds the time threshold for the sampling period, the method includes dividing the sampling period into a finite number of sub-intervals and processing the data samples in each sub-interval so as to produce a respective intermediate result for each sub-interval. Each of these intermediate results is stored directly after it is produced, and these stored intermediate results are processed so as to estimate the maximum time interval error.

17 Claims, 4 Drawing Sheets

(51) Int. Cl.
*H04J 3/14* (2006.01)
*H04L 1/20* (2006.01)
*H04L 7/00* (2006.01)

(56) References Cited

U.S. PATENT DOCUMENTS

| | | | | |
|---|---|---|---|---|
| 2001/0044701 | A1* | 11/2001 | Ballantyne | H04L 1/205 |
| | | | | 702/79 |
| 2002/0188420 | A1* | 12/2002 | Isnard | H04L 43/024 |
| | | | | 702/178 |
| 2009/0110115 | A1* | 4/2009 | Dally | H04L 7/033 |
| | | | | 375/316 |
| 2009/0161744 | A1* | 6/2009 | Smith | H04B 3/462 |
| | | | | 375/226 |

OTHER PUBLICATIONS

Stefano Bregni, Fast Computation of Maximum Time Interval Error by Binary Decomposition, Jun. 6, 1999, pp. 1741-1745.

Stefano Bregni, Measurement of Maximum Time Interval Error for Telecommunications Clock Stability Characterization, Oct. 1996, pp. 900-906, IEEE Transactions on Instrumentation and Measurement, vol. 45, No. 5, IEEE.

Andrzej Dobrogowski, Michal Kasznia, On-line Computation of MTIE using Binary Decomposition and Direct Search with Sequential Data Reducing, 2007, pp. 1008-1013.

* cited by examiner

METHOD AND APPARATUS FOR ESTIMATING A MAXIMUM TIME INTERVAL ERROR IN A DATA TRANSMISSION NETWORK

TECHNICAL FIELD OF THE INVENTION

The present invention relates to methods and devices for estimating a maximum time interval error in a data transmission network. More particularly, the present invention relates methods and devices for real-time estimation of the maximum time interval error for arbitrary time periods, particularly in systems with low memory capacity.

BACKGROUND OF THE INVENTION

Broadband services such as broadcast TV, video on demand (VoD), telecommunication systems, or the Internet have played an increasingly important role. As a result, in order to obtain a lower cost-per-bit effective transport of signals, in particular data to be transported, a new generation of data transmission network technology has been developed.

New generation data transmission networks demand a high degree of synchronization between network transmission elements. Here, an important factor for all network transmission elements is the timing of the network transmission elements. In particular, phase variations in reference clock frequencies governing synchronous network elements may introduce errors at various stages in the network.

One measure of timing errors in synchronous data transmission networks is known as the maximum time interval error (MTIE) and is derived from a plurality of time interval error values. A time interval error (TIE) value is defined as the difference between an actual clock and the reference clock, and for any given sampling period, the maximum time interval error is defined as the maximum peak-to-peak difference of time interval error values within this sampling period.

US 2009/0161744 A1 discloses a method for estimating a maximum time interval error in a data transmission network, using information derived from timing pseudowire or packed data flows.

However, implementing directly the definition of the maximum time interval error does not permit real-time estimation and, therefore, a real-time display of the results. In particular, the maximum time interval error is generally required to be estimated in parallel for a set of different sampling periods, to reveal information about the time varying behavior of a signal, and aid in the diagnosis of faults. These sampling periods typically range from one second up to a day or more. Obtaining the results for such periods conventionally requires a large quantity of data to be collected and, thus, even for the shortest sampling period, the maximum time interval error cannot be calculated until the entire dataset has been gathered.

Further, there is a large amount of storage capacity and computing time required to obtain the estimated values of the maximum time interval error, particularly for long sampling periods.

SUMMARY OF THE INVENTION

It is an object of the present invention to provide improved methods and devices for estimating a maximum time interval error, particularly for long sampling periods.

In one embodiment, a method for estimating a maximum time interval error in a data transmission network comprises receiving a plurality of data samples over a sampling period and comparing a duration of the sampling period to a time threshold for the sampling period. If the duration of the sampling period is less than or equal to the time threshold for the sampling period, the received plurality of data samples is processed so as to calculate in real-time a maximum time interval error. Further, if the duration of the sampling period exceeds the time threshold for the sampling period, the sampling period is divided into a finite number of sub-intervals, the data samples received in a first sub-interval are processed so as to produce a first intermediate result and the processing is successively repeated for successive sub-intervals so as to generate a series of intermediate results. Each element of the series of intermediate results is stored directly after the element is produced so as to generate a series of actual stored intermediate results, and the series of actual stored intermediate results is processed so as to estimate the maximum time interval error.

Thus, if the duration of the sampling period exceeds the time threshold for the sampling period (if the sampling period is denoted as a long sampling period) intermediate results produced for successive sub-intervals are stored, rather than the plurality of data samples. Therefore, the size of the stored data and, thus the required storage capacity, can be reduced while ensuring that the entire plurality of data samples received within the sampling period is accounted for. Furthermore, an actual value for the maximum time interval error is estimated from actual stored data, in particular from the series of actual stored intermediate results and, therefore, before the entire plurality of data samples is gathered. Thus, for long sampling periods, required storage capacity and computing time can be reduced significantly compared to conventional methods for estimating the maximum time interval error, without a significant loss of precision. Further, if the duration of the sampling period is less than or equal to the time threshold for the sampling period, thus if the sampling period is denoted as a short or medium length sampling period, the maximum time interval error can be calculated in real-time by directly processing the plurality of data samples and, therefore, precisely, since less storage capacity and less time for gathering the plurality of data samples is required compared to long sampling periods.

Since the estimation of the maximum time interval error is independent of the estimation of the maximum time interval error for a further period, the time threshold for the sampling period can be arbitrarily selected by a user of the data transmission network, for example corresponding to the system properties of the data transmission network.

For long sampling periods, the plurality of data samples can be for example accumulated in bins of 1% of the duration of the sampling period and thus, the finite number of sub-intervals can be 100.

Further, it should be noted that in this context real-time does not imply that the maximum time interval error is available without any delay or must be strictly synchronized with the flow of the received plurality of data samples. Real-time in this context rather denotes that the received plurality of data samples can be processed substantially at the rate at which the data samples are generated and, thus, gathered.

The plurality of data samples include time interval error values with respect to a synchronization reference of the data transmission network. Most known methods for estimating a maximum time interval error in a data transmission network are based on those time interval errors and, thus, can be used here without requiring additional effort or appropriate adaptions.

Further, a peak detection function can be used to estimate and/or to calculate the maximum time interval error. Herein, a peak detection function denotes a function for locating and measuring the peaks in time-series signals. Since the maximum time interval error is defined as the maximum peak-to-peak difference of time interval error values within a sampling period, such a peak detection function can be used for estimating the maximum time interval error, without requiring additional effort or appropriate adaptions.

According to one embodiment, each element of the series of intermediate results includes a minimum value and a maximum value among the data samples received over the corresponding sub-interval. This form of intermediate result is convenient since the maximum time interval error is defined as the maximum peak-to-peak difference of time interval error values and, therefore, the difference of a minimum value among the time interval error values and a maximum value among the time interval error values. Thus, required storage capacity and computing time can be further reduced.

Each of the minimum values among the received data samples over the corresponding sub-interval can be stored in a first list, each of the maximum values among the received data samples over the corresponding sub-interval can be stored in a second list and the maximum time interval error can be estimated from a minimal value among the elements stored in the first list and a maximum value among the elements stored in the second list. Since the maximum time interval error usually corresponds to the difference between the minimal value among the elements stored in the first list and the maximum value among the elements stored in the second list, the maximum time interval error can be produced with only a small number of samples of the plurality of data samples requiring examination.

According to a further embodiment, the step of processing the data samples so as to calculate in real-time a maximum time interval error if the duration of the sampling period is less than or equal to the time threshold for the sampling period further comprises comparing a quantity of the plurality of data samples received over the sampling period to a threshold value for the quantity of data samples. If the quantity of the plurality of data samples received over the sampling period is less than or equal to the threshold value for the quantity of data samples, the plurality of data samples received over the sampling period are directly stored and the maximum time interval error is calculated from the stored plurality of data samples. If the quantity of the plurality of data samples received over the sampling period exceeds the threshold value for the quantity of data samples, a tree data structure is created on the basis of the plurality of data samples received over the sampling period, the tree data structure is stored and the maximum time interval error is calculated from the stored tree data structure. The threshold value for the quantity of data samples may correspond to an available storage capacity.

Thus, if the duration of the sampling period is less than or equal to the time threshold value for the sampling period, it can be further distinguished whether the sampling period is a short or a medium length period based on the quantity of data samples collected. If the sampling period is denoted as a short period, there is enough storage capacity to directly store the plurality of data samples received over the sampling period, and, therefore, the maximum time interval error can be easily calculated in real-time from the stored plurality of data samples. If the sampling period is denoted as a medium length period, there is not enough storage capacity to directly store each of the plurality of data samples received over the sampling period. However, a tree data structure can be created on the basis of the plurality of data samples received over the sampling period, the tree data structure can be stored and the maximum time interval error can be calculated from the stored tree data structure by using a tree algorithm. Since tree algorithms are known in the art and are fast algorithms, the maximum time interval error can be calculated in real-time for medium length periods, too, without requiring additional effort or appropriate adaptions. As used in this disclosure and the accompanying claims a tree data structure is a non-linear data structure having a root node and potentially many levels of additional nodes, for example defined by the received data samples that form a hierarchy, for example describing a difference between successive data samples of the plurality of data samples.

Further, the method can comprise the steps of comparing the estimated and/or the calculated maximum time interval error to a predefined limit for the maximum time interval error and generating a warning signal for the user of the data transmission network if the estimated and/or the calculated maximum time interval error exceeds the predefined limit for the maximum time interval error. The warning signal is preferably displayed on a display unit of the data transmission network.

Since the maximum time interval error can be used to detect clock instability that can cause data loss on a communication channel within the data transmission network, the maximum time interval error can be used to evaluate the performance of equipment and system. Thus, by generating a warning signal for the user of the data transmission network, if the estimated and/or the calculated maximum time interval error exceeds the predefined limit for the maximum time interval error, the user can be informed that a fault, which might impair customer service, has been diagnosed.

An apparatus according to the present invention for estimating a maximum time interval error in a data transmission network may comprise input means for receiving a plurality of data samples over a sampling period and a processing means for estimating a maximum time interval error. The processing means may comprise a first comparing means for comparing a duration of the sampling period to a time threshold for the sampling period, a first calculating means for processing the received plurality of data samples so as to calculate in real-time a maximum time interval error if the duration of the sampling period is less than or equal to the time threshold for the sampling period, and a second calculating means for processing the received plurality of data samples so as to estimate the maximum time interval error if the duration of the sampling period exceeds the time threshold for the sampling period. The second calculating means may comprise a dividing means for dividing the sampling period into a finite number of sub-intervals, a third calculating means for processing data samples received in a first sub-interval of the sampling period so as to produce a first intermediate result and successively repeating the processing for successive sub-intervals so as to generate a series of intermediate results, a first storing means for storing each element of the series of intermediate results directly after the element is produced so as to generate a series of actual stored intermediate results and a fourth calculating means for processing the series of actual stored intermediate results so as to estimate the maximum time interval error.

Thus the apparatus includes a processing means for estimating a maximum time interval error, wherein the processing means is adapted to store intermediate results produced for successive sub-intervals rather than the plurality of data samples if the duration of the sampling period exceeds the time threshold for the sampling period, thus if the sampling period is denoted as a long sampling period. Therefore, the size of the stored data and, therefore, the required storage capacity within the apparatus can be reduced, while ensuring that the entire plurality of data samples within the sampling period is accounted for. Furthermore, the fourth calculating means is adapted to estimate an actual value for the maximum time interval error from actual stored data, in particular from the series of actual stored intermediate results and, therefore, before the entire plurality of data samples is gathered. Thus, for long sampling periods, required storage capacity and computing time can be significantly reduced compared to conventional apparatuses for estimating the maximum time interval error, without a significant loss of precision when estimating the maximum time interval error. Further, the processing means is adapted to calculate the maximum time interval error in real-time by directly processing the plurality of data samples and, therefore, precisely, if the duration of the sampling period is less than or equal to the time threshold for the sampling period, thus if the sampling period is denoted as a short or medium length sampling period, since less storage capacity and less time for gathering the plurality of data samples is required compared to long sampling periods.

Since, in an apparatus according to the invention, the estimation of the maximum time interval error is independent of the estimation of the maximum time interval error for a further period, the time threshold for the sampling period can be arbitrarily selected by a user of the data transmission. For example, the time threshold for the sampling period may be selected to correspond to the system properties of the data transmission network. Thus the apparatus may include further input means for allowing a user of the data transmission network to selectively input the time threshold for the sampling period.

For long sampling periods, the dividing means can for example accumulate the plurality of data samples in bins of 1% of the duration of the sampling period and thus, the finite number of sub-intervals can be 100.

Further, it should be noted that in this context real-time does not imply that the maximum time interval error is available without any delay or must be strictly synchronized with the flow of the received plurality of data samples. Real-time in this context rather denotes that the received plurality of data samples can be processed substantially at the rate at which the data samples are generated and, thus, gathered.

The plurality of data samples include time interval error values with respect to a synchronization reference of the data transmission network. Most known apparatuses for estimating a maximum time interval error in a data transmission network are based on methods using those time interval errors, which, thus, can be used without requiring additional effort or appropriate adaptions to the apparatus.

Further, the first calculating means and/or the fourth calculating means can use a peak detection algorithm stored in the processing means, to estimate and/or to calculate the maximum time interval error. As used in this disclosure, a peak detection function denotes a function for locating and measuring the peaks in time-series signals. Since the maximum time interval error is defined as the maximum peak-to-peak difference of time interval error values within a sampling period, program code for such a peak detection function can be stored and used for estimating the maximum time interval error, without requiring additional effort or appropriate adaptions.

In some embodiments, each element of the series of intermediate results may include a minimum value and a maximum value among the data samples received over the corresponding sub-interval since, as noted above, the maximum time interval error is defined as the maximum peak-to-peak difference of time interval error values (that is, the difference of a minimum value among the time interval error values and a maximum value among the time interval error values). Thus, required storage capacity within the apparatus and computing time can be further reduced.

Each of the minimum values among the data samples received over a corresponding sub-interval can be stored by the first storing means in a first list, each of the maximum values among the data samples received over a corresponding sub-interval can be stored by the first storing means in a second list, and the fourth calculating means can use a minimal value among the elements stored in the first list and a maximum value among the elements stored in the second list to estimate the maximum time interval error. Since the maximum time interval error usually corresponds to the difference between the minimal value among the elements stored in the first list and the maximum value among the elements stored in the second list, the fourth calculating means thus may be configured to produce the maximum time interval error with only a small number of samples of the plurality of data samples requiring examination.

In some embodiments, the first calculating means comprises a second comparing means for comparing a quantity of the plurality of data samples received over the sampling period to a threshold value for the quantity of data samples and a fifth calculating means for calculating the maximum time interval error if the quantity of the plurality of data samples received over the sampling period is less than or equal to the threshold value for the quantity of data samples. The fifth calculating means may include a second storing means for directly storing the plurality of data samples received over the sampling period and a sixth calculating means for calculating the maximum time interval error from the stored plurality of data samples. The first calculating means may further include a seventh calculating means for calculating the maximum time interval if the quantity of the plurality of data samples received over the sampling period exceeds the threshold value for the quantity of data samples. This seventh calculating means may include a creating means for creating a tree data structure on the basis of the plurality of data samples received over the sampling period, a third storing means for storing the tree data structure, and an eighth calculating means for calculating the maximum time interval error from the stored tree data structure. In this embodiment, the threshold value for the quantity of data samples may correspond to an available storage capacity within the apparatus.

With this first calculating means configuration, if the duration of the sampling period is less than or equal to the time threshold value for the sampling period, the first calculating means can further distinguish whether the sampling period is a short or a medium length period. If the sampling period is denoted as a short period, there is enough storage capacity within the apparatus to directly store the plurality of data samples received over the sampling period, and, therefore, the maximum time interval error can be easily calculated in real-time from the stored plurality of data samples. If the sampling period is denoted as a medium length period, there is not enough storage capacity within the apparatus to directly store each of the plurality of data samples received over the sampling period. However, a tree data structure can be created by the creating means on the basis of the plurality of data samples received over the sampling period, the tree data structure can be stored and the maximum time interval error can be calculated from the stored tree data structure by using a tree algorithm stored in the processing means. Since tree algorithms are known in the art and are fast algorithms, such an algorithm can be implemented in the processing means without requiring additional effort or appropriate adaptions and the maximum time interval error can be calculated in real-time for medium length periods, too. Here, a tree is a non-linear data structure having a root node and potentially many levels of additional nodes, for example defined by the received data samples that form a hierarchy, for example describing a difference between successive data samples of the plurality of data samples.

The invention further encompasses a data transmission network which includes an estimating apparatus as described above. In such a data transmission network, if the duration of the sampling period exceeds the time threshold for the sampling period, thus is denoted as a long sampling period, intermediate results produced for successive sub-intervals are stored, rather than the plurality of data samples and, therefore, the size of the stored data and, therefore, the required storage capacity can be reduced, while ensuring that the entire plurality of data samples within the sampling periods is accounted for. Furthermore, an actual value for the maximum time interval error is estimated from actual stored data, in particular from the series of actual stored intermediate results and, therefore, before the entire plurality of data samples is gathered. Thus, for long sampling periods, required storage capacity and computing time can be significantly reduced compared to conventional methods for estimating the maximum time interval error, without a significant loss of precision. Further, if the duration of the sampling period is less than or equal to the time threshold for the sampling period, thus if the sampling period is denoted as a short or medium length sampling period, the maximum time interval error can be calculated in real-time by directly processing the plurality of data samples and, therefore, precisely, since less storage capacity and less time for gathering the plurality of data samples is required compared to long sampling periods.

The data transmission network may further include a third comparing means for comparing the estimated and/or the calculated maximum time interval error to a predefined limit for the maximum time interval error and a warning means for generating a warning signal for a user of the data transmission network if the estimated and/or the calculated maximum time interval error exceeds the predefined limit for the maximum time interval error. The warning signal is preferably displayed on a display unit of the data transmission network.

Since the maximum time interval error can be used to detect clock instability that can cause data loss on a communication channel within the data transmission network, the maximum time interval error can be used to evaluate the performance of equipment and system. Thus, by generating a warning signal for the user of the data transmission network, if the estimated time interval error exceeds the predefined limit for the maximum time interval error, the user can be informed that a fault, which might impair customer service, has been diagnosed.

These and other advantages and features of the invention will be apparent from the following description of illustrative embodiments, considered along with the accompanying drawings.

DESCRIPTION OF ILLUSTRATIVE EMBODIMENTS

Figure 1:
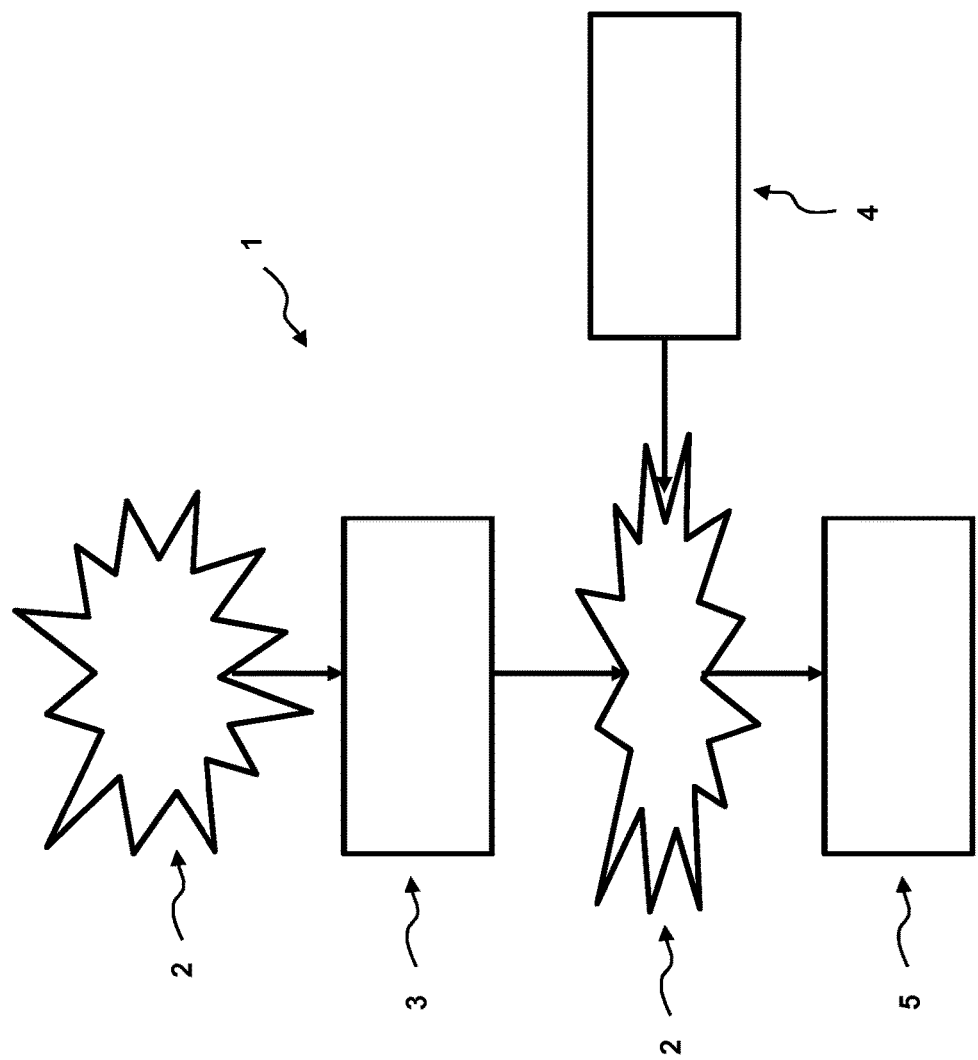
FIG. 1 is a block diagram of a data transmission network in which embodiments of the present invention may be implemented.

As shown in FIG. 1 a data transmission network 1 in which the present invention may be implemented may include a transport network 2 including at least one transport node 3. Generally, larger networks include a plurality of transport nodes, which can be realized for example by routers or switches. Here, at a central time information distribution node 4, a digital timing signal, including the central time information for at least one of the timing parameters absolute time, relative time, frequency and phase is transmitted into the transport network 2. Further, the network 1 includes at least one, usually a plurality, of receiving nodes 5 at which the digital timing signal including the central time information is received and processed in order to synchronize the timing at the receiving node 5 and the time information at the central time information distribution node 4. This information can, for example, be used to affect a clock recovery so that one or more signals created at the receiving node are transmitted according to a prescribed timing pattern.

One measure of timing errors in synchronous data transmission networks is known as the maximum time interval error (MTIE) and is derived from a plurality of time interval error values. Here, a time interval error (TIE) value is defined as the difference between an actual clock and the reference clock, and for any given sampling period, the maximum time interval error is defined as the maximum peak-to-peak difference of time interval error values within this sampling period.

However, implementing directly the definition of the maximum time interval error does not permit real-time estimation and, therefore, a real-time display of the results. In particular, the maximum time interval error is generally required to be estimated in parallel for a set of different sampling periods, to reveal information about the time varying behavior of a signal, and aid in the diagnosis of faults. These sampling periods typically range from one second up to a day or more. Obtaining the results for such periods conventionally requires a large quantity of data to be collected and, thus, even for the shortest sampling period, the maximum time interval error cannot be calculated until the entire dataset has been gathered.

Further, there is a large amount of storage capacity and computing time required to obtain the estimated values of the maximum time interval error, particularly for long sampling periods.

Figure 2:
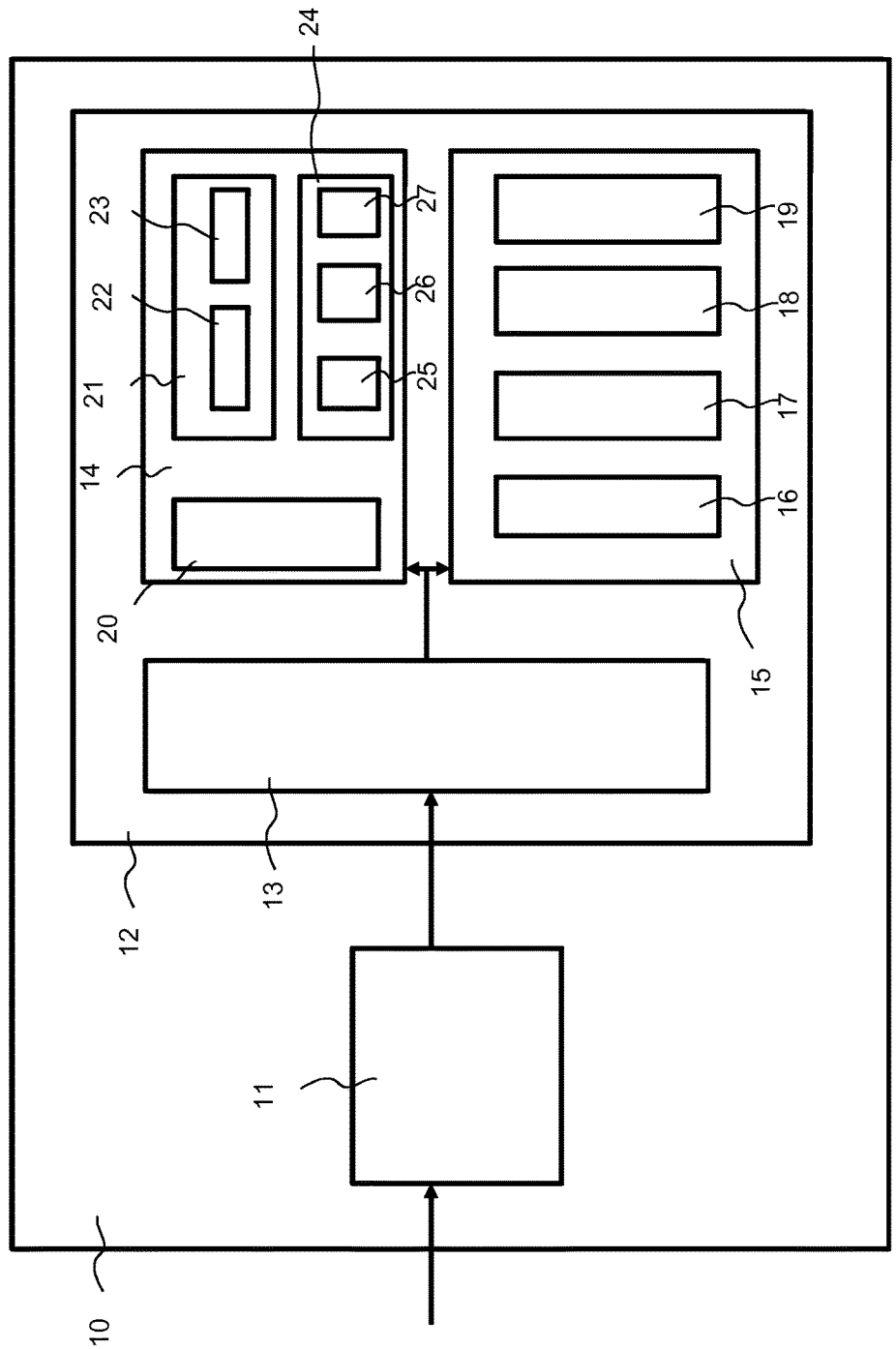
FIG. 2 is a block diagram of an apparatus for estimating a maximum time interval error according to a first embodiment of the present invention.

FIG. 2 illustrates a block diagram of an apparatus 10 for estimating a maximum time interval error in a data transmission network according to a first embodiment. The illustrated apparatus 10 comprises an input means 11 for receiving a plurality of data samples over a sampling period and a processing means 12 for estimating a maximum time interval error. Apparatus 10 may be included at any suitable point in data transmission network 1 (FIG. 1) for receiving data samples via input means 11. Processing means 12 may comprise a suitable general or special purpose processing device adapted to receive data samples from input means 11 and to implement the various comparing means, calculating means, storing means, creating means, and dividing means described further below in reference to the figures.

The processing means 12 comprises a first comparing means 13 for comparing a duration of the sampling period to a time threshold for the sampling period, a first calculating means 14 for processing the received plurality of data samples so as to calculate in real-time the maximum time interval error if the duration of the sampling period is less than or equal to the time threshold for the sampling period, and a second calculating means 15 for processing the received plurality of data samples so as to estimate the maximum time interval error if the duration of the sampling period exceeds the time threshold for the sampling period. As can be seen in FIG. 2, the second calculating means 15 comprises a dividing means 16 for dividing the sampling period into a finite number of sub-intervals, a third calculating means 17 for processing the data samples received over a first sub-interval of the sampling period so as to produce a first intermediate result and successively repeating the processing for successive sub-intervals so as to generate a series of intermediate results, a first storing means 18 for storing each element of the series of intermediate results directly after the element is produced so as to generate a series of actual stored intermediate results, and a fourth calculating means 19 for processing the series of actual stored intermediate results so as to estimate the maximum time interval error.

Thus, the apparatus 10 according to FIG. 2 comprises a processing means 12 for estimating a maximum time interval error, wherein the processing means 12 is adapted to store intermediate results produced for successive sub-intervals rather than the plurality of data samples if the duration of the sampling period exceeds the time threshold for the sampling period, thus if the sampling period is denoted as a long sampling period. Therefore, the size of the stored data and, therefore, the required storage capacity within the apparatus 10 can be reduced, while ensuring that the entire plurality of data samples within the sampling periods is accounted for. Furthermore, the fourth calculating means 19 is accomplished to estimate an actual value for the maximum time interval error from actual stored data, in particular from the series of actual stored intermediate results and, therefore, before the entire plurality of data samples is gathered. Further, the processing means 12 is adapted to calculate the maximum time interval error in real-time by directly processing the plurality of data samples and, therefore, precisely, if the duration of the sampling period is less than or equal to the time threshold for the sampling period, thus if the sampling period is denoted as a short or medium length sampling period, since less storage capacity and less time for gathering the plurality of data samples is required compared to long sampling periods.

Since, in the apparatus 10 according to the invention, the estimation of the maximum time interval error is independent of the estimation of the maximum time interval error for a further period, the time threshold for the sampling period can be arbitrarily selected by a user of the data transmission, for example corresponding to the system properties of the data transmission network.

For long sampling periods in some implementations of the invention, the dividing means 16 accumulates the plurality of data samples in bins of 1% of the duration of the sampling period and thus, the finite number of sub-intervals is 100.

Further, it should be noted that in this context real-time does not imply that the maximum time interval error is available without any delay or must be strictly synchronized with the flow of the received plurality of data samples. Real-time in this context rather denotes that the received plurality of data samples can be processed substantially at the rate at which the data samples are generated and, thus, gathered.

According to the embodiment shown in FIG. 2, the plurality of data samples received at the input means 11 include time interval error values with respect to a synchronization of the data transmission network.

Further, the first calculating means 14 and the fourth calculating means 19 use a peak detection algorithm to estimate and/or calculate the maximum time interval error, wherein a code (program code) of the peak detection algorithm is stored in the processing means 12 and executed by the first calculating means 14 and the fourth calculating means 19.

According to the embodiment shown in FIG. 2, each element of the series of intermediate results includes a minimum value and a maximum value among the data samples received over the corresponding sub-interval.

Each of the minimum values among the data samples received over a corresponding sub-interval may be stored by the first storing means 18 in a first list, and each of the maximum values among the data samples received over a corresponding sub-interval may be stored by the first storing means 18 in a second list. The fourth calculating means 19 then uses a minimum value among the elements stored in the first list and a maximum value among the elements stored in the second list to estimate the maximum time interval error.

As shown in FIG. 2, the first calculating means 14 further comprises a second comparing means 20 for comparing a quantity of the plurality of data samples received over the sampling period to a threshold value for the quantity of data samples. There is further shown a fifth calculating 21 means for calculating the maximum time interval error if the quantity of the plurality of data samples is less than or equal to the threshold value for the quantity of data samples, which comprises a second storing means 22 for directly storing the plurality of data samples received over the sampling period and a sixth calculating means 23 for calculating the maximum time interval error from the stored plurality of data samples. There is also shown a seventh calculating means 24 for calculating the maximum time interval error if the quantity of the plurality of data samples exceeds the threshold value for the quantity of data samples, which comprises a creating means 25 for creating a tree data structure on the basis of the plurality of data samples received over the sampling period, a third storing means 26 for storing the tree data structure, and an eighth calculating means 27 for calculating the maximum time interval error from the stored tree data structure. In the embodiment shown in FIG. 2, the threshold value for the quantity of data samples may correspond to an available storage capacity within the apparatus 10.

Thus, if the duration of the sampling period is less than or equal to the time threshold value for the sampling period, the first calculating means 14 can further distinguish whether the sampling period is a short or a medium length period. If the sampling period is denoted as a short period, there is enough storage capacity within the apparatus 10 to directly store the plurality of data samples received over the sampling period, and, therefore, the maximum time interval error can be easily calculated in real-time from the stored plurality of data samples. If the sampling period is denoted as a medium length period, there is not enough storage capacity within the apparatus 10 to directly store each of the plurality of data samples received over the sampling period. However, a tree data structure can be created by the creating means 25 on the basis of the plurality of data samples received over the sampling period, the tree data structure can be stored and the maximum time interval error can be calculated from the stored tree data structure by using a tree algorithm stored in the processing means. Since tree algorithms are known in the art and are fast algorithms, such an algorithm can be implemented in the processing means 12 without requiring additional effort or appropriate adaptions and the maximum time interval error can be calculated in real-time for medium length periods, too. Herein, a tree is a non-linear data structure having a root node and potentially many levels of additional nodes, for example defined by the received data samples that form a hierarchy, for example describing a difference between successive data samples of the plurality of data samples.

Figure 3:
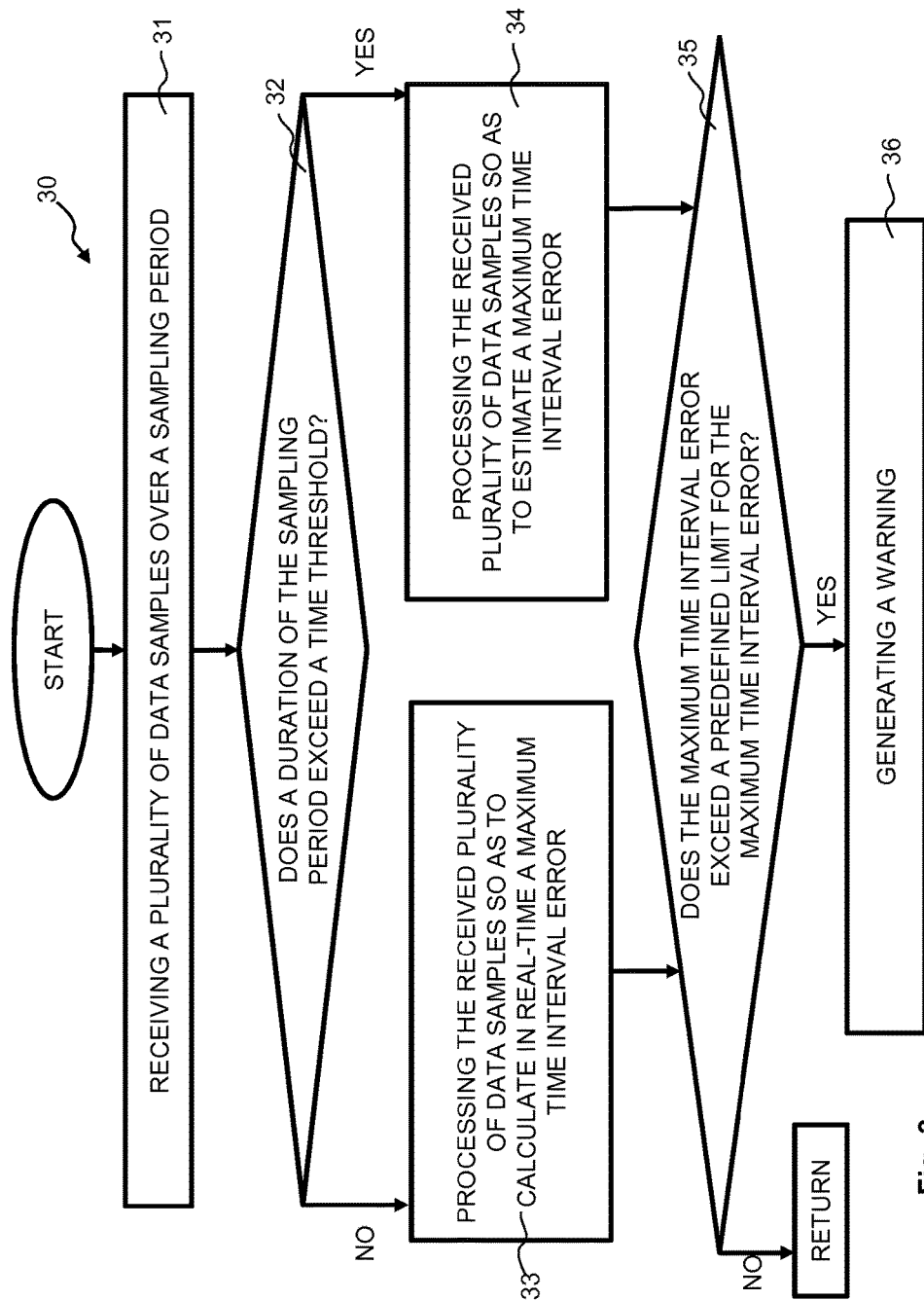
FIG. 3 is a flow chart of a method for estimating a maximum time interval error in a data transmission network according to an embodiment of the invention.

FIG. 3 illustrates a flow chart of a method 30 for estimating a maximum time interval error in a data transmission network according to a second embodiment. In this embodiment, the method 30 begins at step 31, wherein a plurality of data samples are received over a sampling period. At a following step 32, a duration of the sampling period is compared to a time threshold for the sampling period. If the duration of the sampling period is less than or equal to the time threshold for the sampling period, the received plurality of data samples are processed at step 33 so as to calculate in real-time a maximum time interval error. However, if the duration of the sampling period exceeds the time threshold for the sampling period, the maximum time interval error is estimated at step 34 by dividing the sampling period into a finite number of sub-intervals, processing the data samples received over a first sub-interval so as to produce a first intermediate result and successively repeating the processing for successive sub-intervals so as to generate a series of intermediate results, storing each element of the series of intermediate results directly after the element is produced so as to generate a series of actual stored intermediate results, and processing the series of actual stored intermediate results so as to estimate the maximum time interval error.

Thus, according to the method, if the duration of the sampling period exceeds the time threshold for the sampling period, thus if the sampling period is denoted as a long sampling period, intermediate results produced for successive sub-intervals are stored, rather than the plurality of data samples and, therefore, the size of the stored data and, therefore, the required storage capacity can be reduced, while ensuring that the entire plurality of data samples received within the sampling period is accounted for. Furthermore, an actual value for the maximum time interval error is estimated from actual stored data, in particular from the series of actual stored intermediate results and, therefore, before the entire plurality of data samples is gathered. Further, if the duration of the sampling period is less than or equal to the time threshold for the sampling period, thus if the sampling period is denoted as a short or medium length sampling period, the maximum time interval error can be calculated in real-time by directly processing the plurality of data samples and, therefore, precisely, since less storage capacity and less time for gathering the plurality of data samples is required compared to long sampling periods.

Since the estimation of the maximum time interval error is independent of the estimation of the maximum time interval error for a further period, the time threshold for the sampling period can be arbitrarily selected by a user of the data transmission network, for example corresponding to the system properties of the data transmission network. For long sampling periods, the plurality of data samples may, for example, be accumulated in bins of 1% of the duration of the sampling period and thus, the finite number of sub-intervals may be 100.

Further, it should be noted that in this context real-time does not imply that the maximum time interval error is available without any delay or must be strictly synchronized with the flow of the received plurality of data samples. Real-time in this context rather denotes that the received plurality of data samples can be processed substantially at the rate at which the data samples are generated and, thus, gathered.

According to the embodiment shown in FIG. 3, the plurality of data samples include time interval error samples with respect to a synchronization reference of the data transmission network.

Further, a peak detection function is used to estimate the maximum time interval error.

According to the embodiment shown in FIG. 3, each element of the series of intermediate results includes a minimum value and a maximum value among the data samples received over the corresponding sub-interval.

Here, each of the minimum values among the data samples received over a corresponding sub-interval is stored in a first list, each of the maximum values among the data samples received over a corresponding sub-interval is stored in a second list and the maximum time interval error is estimated from a minimum value among the elements stored in the first list and a maximum value among the elements stored in the second list.

FIG. 3 further shows the step 35 of comparing the estimated maximum time interval error and/or the calculated maximum time interval error to a predefined limit for the maximum time interval error, and the step 36 of generating a warning signal for a user of the data transmission network if the estimated time interval error exceeds the predefined limit for the maximum time interval error. According to the embodiment of FIG. 3, the warning signal is displayed on a display unit of the data transmission network.

Since the maximum time interval error can be used to detect clock instability that can cause data loss on a communication channel within the data transmission network, the maximum time interval error can be used to evaluate the performance of equipment and system. Thus, by generating a warning signal for the user of the data transmission network, if the estimated time interval error exceeds the predefined limit for the maximum time interval error, the user can be informed that a fault, which might impair customer service, has been diagnosed.

Figure 4:
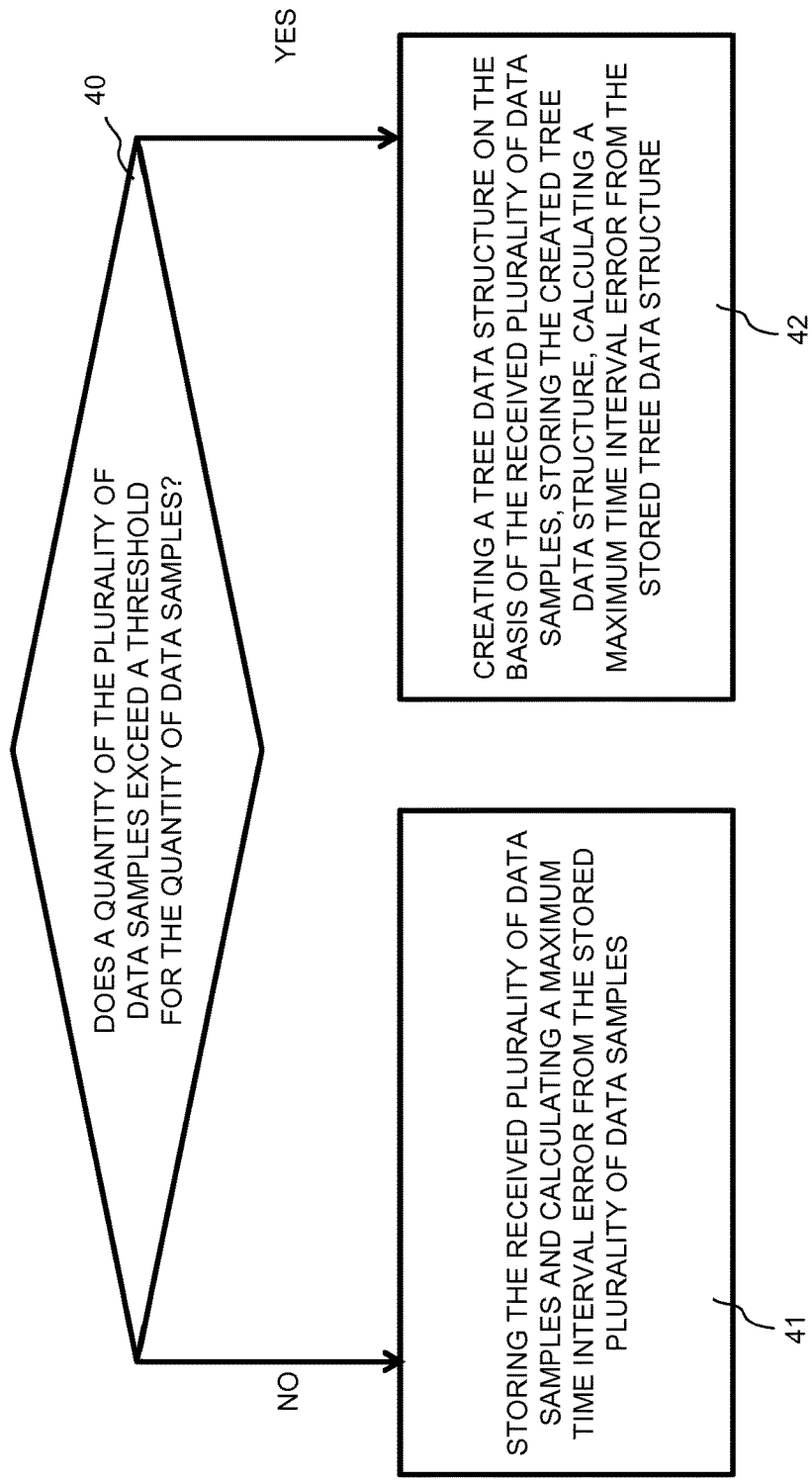
FIG. 4 is a flow chart showing another aspect of the present invention which varies the storage of data samples and calculating a maximum time interval error depending upon the quantity of data samples.

FIG. 4 illustrates processing the received plurality of data samples so as to calculate in real-time the maximum time interval error if the duration of the sampling period is less than or equal to the time threshold for the sampling period, according to a third embodiment.

According to the embodiment shown in FIG. 4, processing the received plurality of data samples so as to calculate in real-time the maximum time interval error if the duration of the sampling period is less than or equal to the time threshold for the sampling period comprises the step 40 of comparing a quantity of the plurality of data samples received over the sampling period to a threshold value for the quantity of data samples.

There is further shown the step 41 of directly storing the plurality of data samples received over the sampling period and calculating the maximum time interval error from the stored plurality of data samples if the quantity of data samples received over the sampling period is less than or equal to the threshold value for the quantity of data samples.

If the quantity of the plurality of data samples exceeds the threshold value for the quantity of data samples received over the sampling period, at step 42 a tree data structure is created on the basis of the plurality of data samples received over the sampling period, the tree data structure is stored and the maximum time interval error is estimated from the stored tree data structure. According to the embodiment shown in FIG. 4, the threshold value for the quantity of data samples corresponds to an available storage capacity.

Thus, if the duration of the sampling period is less than or equal to the time threshold value for the sampling period, it can be further distinguished whether the sampling period is a short or a medium length period. If the sampling period is denoted as a short period, there is enough storage capacity to directly store the plurality of data samples received over the sampling period, and, therefore, the maximum time interval error can be easily calculated in real-time from the stored plurality of data samples. If the sampling period is denoted as a medium length period, there is not enough storage capacity to directly store each of the plurality of data samples received over the sampling period. However, a tree data structure can be created on the basis of the plurality of data samples received over the sampling period, the tree data structure can be stored and the maximum time interval error can be calculated from the stored tree data structure by using a tree algorithm. Since tree algorithms are known in the art and are fast algorithms, the maximum time interval error can be calculated in real-time for medium length periods, too, without requiring additional effort or appropriate adaptions. Herein, a tree is a non-linear data structure having a root node and potentially many levels of additional nodes, for example defined by the received data samples that form a hierarchy, for example describing a difference between successive data samples of the plurality of data samples.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method for estimating a maximum time interval error in a data transmission network, the method comprising:
   (a) receiving at a processing device a plurality of data samples from the data transmission network over a sampling period;
   (b) with the processing device, comparing a duration of the sampling period to a sampling period time threshold;
   (c) if the duration of the sampling period is less than or equal to the sampling period time threshold, processing the plurality of data samples with the processing device so as to calculate in real time a maximum time interval error for the sampling period, wherein processing the plurality of data samples so as to calculate in real time the maximum time interval error includes,
      (i) comparing a quantity of the plurality of data samples received over the sampling period to a data sample quantity threshold value;
      (ii) if the quantity of the plurality of data samples received over the sampling period is less than or equal to the data sample quantity threshold value, directly storing the plurality of data samples received over the sampling period and calculating the maximum time interval error from the stored plurality of data samples; and
      (iii) if the quantity of the plurality of data samples received over the sampling period exceeds the data sample quantity threshold value, creating a tree data structure on the basis of the plurality of data samples received over the sampling period, storing the tree data structure, and calculating the maximum time interval error from the stored tree data structure; and
   (d) if the duration of the sampling period exceeds the sampling period time threshold, dividing the sampling period into a number of sub-intervals, processing the data samples received in each respective sub-interval with the processing device to produce a respective intermediate result for each respective sub-interval, storing each respective intermediate result directly after the respective intermediate result is produced, and processing the stored intermediate results with the processing device so as to produce a maximum time interval error estimate.

2. The method of claim 1 wherein the data samples each include a time interval error value with respect to a synchronization reference of the data transmission network.

3. The method of claim 1 further including applying a peak detection function in processing the stored intermediate results so as to produce the maximum time interval error estimate.

4. The method of claim 1 wherein each respective intermediate result includes a minimum value and a maximum value among the data samples received over the respective sub-interval corresponding to that intermediate result.

5. The method of claim 4 wherein:
   (a) storing each respective intermediate result includes storing the respective minimum value included in that intermediate result in a first list, and storing the respective maximum value included in that intermediate result in a second list; and (b) the maximum time interval error estimate is produced from the lowest value among the values stored in the first list and the highest value among the elements stored in the second list.

6. The method of claim 1 wherein data sample quantity threshold value corresponds to an available storage capacity of a processing device performing the processing of the plurality of data samples so as to calculate in real time the maximum time interval error for the sampling period.

7. The method of claim 1 wherein the method further comprises:
(a) comparing the maximum time interval error or the maximum time interval error estimate to a predefined maximum time interval error limit; and
(b) if the comparison at element (a) of this claim shows that the maximum time interval error limit is exceeded, generating a warning signal for a user of the data transmission network.

8. An apparatus for estimating a maximum time interval error in a data transmission network, the apparatus comprising:
(a) input means for receiving a plurality of data samples over a sampling period;
(b) first comparing means for comparing a duration of the sampling period to a sampling period time threshold;
(c) first calculating means for processing the received plurality of data samples so as to calculate in real time a maximum time interval error if the duration of the sampling period is less than or equal to the sampling period time threshold;
(d) second calculating means for processing the received plurality of data samples if the duration of the sampling period exceeds the sampling period time threshold, the second calculating means comprising,
(i) dividing means for dividing the sampling period into a number of sub-intervals,
(ii) third calculating means for processing the data samples received in each respective sub-interval to produce a respective intermediate result for each respective sub-interval,
(iii) first storing means for storing each respective intermediate result directly after the respective intermediate result is produced, and
(iv) fourth calculating means for processing the stored intermediate results so as to produce a maximum time interval error estimate; and
(e) wherein the first calculating means comprises,
(i) second comparing means for comparing a quantity of the plurality of data samples received over the sampling period to a threshold value for the quantity of data samples;
(ii) fifth calculating means for calculating the maximum time interval error if the quantity of the plurality of data samples is less than or equal to the threshold value for the quantity of data samples, the fifth calculating means comprising, second storing means for directly storing the plurality of data samples received over the sampling period, and sixth calculating means for calculating the maximum time interval error from the stored plurality of data samples; and
(iii) seventh calculating means for calculating the maximum time interval error if the quantity of the plurality of data samples exceeds the threshold value for the quantity of data samples, the seventh calculating means comprising, creating means for creating a tree data structure on the basis of the plurality of data samples received over the sampling period, third storing means for storing the tree data structure, and eighth calculating means for calculating the maximum time interval error from the stored tree data structure.

9. The apparatus of claim 8 wherein the data samples each include a time interval error value with respect to a synchronization reference of the data transmission network.

10. The apparatus of claim 8 wherein the first calculating means applies a peak detection algorithm stored in the apparatus to calculate the maximum time interval error.

11. The apparatus of claim 8 wherein the fourth calculating means applies a peak detection algorithm stored in the apparatus to product the maximum time interval estimate.

12. The apparatus of claim 8 wherein each respective intermediate result includes a minimum value and a maximum value among the data samples received over the respective sub-interval corresponding to that intermediate result.

13. The apparatus of claim 12 wherein:
(a) the first storing means stores each respective minimum value in a first list and stores each respective maximum value in a second list; and
(b) the fourth calculating means selects the lowest value stored in the first list and the highest value stored in the second list to produce the maximum time interval error estimate.

14. A data transmission network comprising:
(a) at least one transport network and at least one transport node;
(b) at least one receiving node;
(c) a central time information distribution node;
(d) input means for receiving a plurality of data samples over a sampling period, each data sample comprising a time interval error value;
(e) first comparing means for comparing a duration of the sampling period to a sampling period time threshold;
(f) first calculating means for processing the received plurality of data samples so as to calculate in real time a maximum time interval error if the duration of the sampling period is less than or equal to the sampling period time threshold; and
(g) second calculating means for processing the received plurality of data samples if the duration of the sampling period exceeds the sampling period time threshold, the second calculating means comprising,
(i) dividing means for dividing the sampling period into a number of sub-intervals,
(ii) third calculating means for processing the data samples received in each respective sub-interval to produce a respective intermediate result for each respective sub-interval,
(iii) first storing means for storing each respective intermediate result directly after the respective intermediate result is produced, and
(iv) fourth calculating means for processing the stored intermediate results so as to produce a maximum time interval error estimate; and
(h) wherein the first calculating means comprises,
(i) second comparing means for comparing a quantity of the plurality of data samples received over the sampling period to a threshold value for the quantity of data samples;
(ii) fifth calculating means for calculating the maximum time interval error if the quantity of the plurality of data samples is less than or equal to the threshold value for the quantity of data samples, the fifth calculating means comprising, second storing means for directly storing the plurality of data samples received over the sampling period, and sixth calculating means for calculating the maximum time interval error from the stored plurality of data samples, and (iii) seventh calculating means for calculating the maximum time interval error if the quantity of the plurality of data samples exceeds the threshold value for the quantity of data samples, the seventh calculating means comprising, creating means for creating a tree data structure on the basis of the plurality of data samples received over the sampling period, third storing means for storing the tree data structure, and eighth calculating means for calculating the maximum time interval error from the stored tree data structure.

15. The data transmission network of claim 14 wherein each respective intermediate result includes a minimum value and a maximum value among the data samples received over the respective sub-interval corresponding to that intermediate result.

16. The data transmission network of claim 15 wherein:

(a) the first storing stores each respective minimum value in a first list and stores each respective maximum value in a second list; and (b) the fourth calculating means selects the lowest value stored in the first list and the highest value stored in the second list to produce the maximum time interval error estimate.

17. The data transmission network of claim 14 further including:

(a) third comparing means for comparing the maximum time interval error or the maximum time interval error estimate to a predefined maximum time interval error limit; and (b) warning means for generating a warning signal for the user of the data transmission network if the comparison at element (a) of this claim shows that the maximum time interval error is exceeded.

* * * * *